(12) United States Patent
Bruhn

(10) Patent No.: US 10,583,778 B2
(45) Date of Patent: Mar. 10, 2020

(54) SYSTEM FOR GENERATING A MOVING IMAGE IN AN AIRCRAFT

(71) Applicant: Airbus Operations GmbH, Hamburg (DE)

(72) Inventor: Marvin Bruhn, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 16/220,073

(22) Filed: Dec. 14, 2018

(65) Prior Publication Data

US 2019/0184894 A1    Jun. 20, 2019

(30) Foreign Application Priority Data

Dec. 14, 2017 (DE) .................... 20 2017 107 609 U

(51) Int. Cl.

| | |
|---|---|
| *F21V 21/00* | (2006.01) |
| *B60Q 3/47* | (2017.01) |
| *B64D 11/00* | (2006.01) |
| *G06T 7/246* | (2017.01) |
| *B64C 39/02* | (2006.01) |
| *H04N 5/225* | (2006.01) |
| *H05B 33/08* | (2020.01) |

(52) U.S. Cl.
CPC ............... *B60Q 3/47* (2017.02); *B64C 39/02* (2013.01); *B64D 11/00* (2013.01); *G06T 7/246* (2017.01); *H04N 5/2256* (2013.01); *H05B 33/0806* (2013.01); *H05B 33/0845* (2013.01); *B64D 2011/0038* (2013.01); *B64D 2203/00* (2013.01)

(58) Field of Classification Search
CPC ........ B60Q 3/47; B60D 1/00; B60D 11/0015; B60D 2011/0038; B60D 2203/00; G06F 3/1446; G06F 3/1454; G06F 3/04847; G06F 2203/04803; G06T 7/246; H04N 5/2256; H05B 33/0806; H05B 33/0845
USPC ....................................... 362/471
See application file for complete search history.

(56) References Cited

U.S. PATENT DOCUMENTS

| | | | |
|---|---|---|---|
| 9,505,497 B2 * | 11/2016 | DeMers | .............. B64D 11/0015 |
| 2004/0217234 A1 | 11/2004 | Jones et al. | |
| 2009/0046252 A1 | 2/2009 | Heym et al. | |
| 2010/0188506 A1 * | 7/2010 | Dwyer | ...................... H04N 7/18 348/144 |
| 2014/0085337 A1 | 3/2014 | Velten et al. | |

(Continued)

FOREIGN PATENT DOCUMENTS

| | | |
|---|---|---|
| DE | 10 2006 006 364 A1 | 8/2007 |
| DE | 10 2007 038 881 A1 | 3/2009 |
| DE | 10 2012 108 956 A1 | 3/2014 |

*Primary Examiner* — Laura K Tso
(74) *Attorney, Agent, or Firm* — Lerner, David, Littenberg, Krumholz & Mentlik, LLP

(57) ABSTRACT

A system for generating a moving image in an aircraft, includes a multiplicity of LEDs, a signal input unit, into which image information is fed, a signal output unit coupled to the multiplicity of LEDs and configured for transmitting the image information to the multiplicity of LEDs, and a gyroscopic sensor for acquiring a spatial position of the aircraft, wherein the LEDs are arranged in the form of a grid on an aircraft interior wall, such that the image is a schematic reproduction of the image information and the signal output unit is coupled to the gyroscopic sensor in such a way that the position of the image is matched to the spatial position of the aircraft, such that the image forms an artificial horizon for a viewer.

10 Claims, 2 Drawing Sheets

(56) References Cited

U.S. PATENT DOCUMENTS

| | | |
|---|---|---|
| 2015/0008282 A1* | 1/2015 | Boomgaarden .... B64D 11/0015 |
| | | 244/118.5 |
| 2015/0077337 A1 | 3/2015 | Coto-Lopez et al. |
| 2015/0131302 A1* | 5/2015 | Inoue ................. H01L 51/0072 |
| | | 362/382 |
| 2016/0325836 A1 | 11/2016 | Teo |
| 2017/0129607 A1 | 5/2017 | Grant |

* cited by examiner

SYSTEM FOR GENERATING A MOVING IMAGE IN AN AIRCRAFT

FIELD OF THE INVENTION

The present invention relates to a system for generating a moving image in an aircraft, having a multiplicity of light-emitting diodes (LEDs), a signal input unit, into which image information is fed, a signal output unit, which is coupled to the multiplicity of LEDs and which is suitable for transmitting the image information to the multiplicity of LEDs, and a gyroscopic sensor for acquiring a spatial position of the aircraft.

BACKGROUND OF THE INVENTION

In known passenger aircraft, there are fundamentally LEDs that are used for cabin lighting: in an Airbus, the cabin management system (CIDS) drives LEDs for example in such a way that specific desired color tones or lighting conditions are achieved. By way of example, the light may be adjusted in this case in the aircraft cabin to external lighting conditions in such a way that a matching overall impression of the interior and the exterior is achieved. In addition to this, displays and projections may be used in order to decorate windowless regions of an aircraft or to provide information (for example seat numbers).

For example, DE 102007038881 describes LED arrays for aircraft, wherein the LEDs are able to be driven individually in order to generate composite variable image content. In this case, the LEDs serve as a light source for a respective projection, and are therefore themselves the projection means.

US20040217234 describes an image display, which moves depending on a movement of a flying-wing aircraft, on displays for avoiding motion sickness. In this case, passengers who are sitting in windowless regions of the flying-wing aircraft are intended to be provided with an image that simulates the view from a window.

Producing a completely windowless aircraft with commercially available displays at the present time still takes up a large amount of precious space in the cabin. At the same time, a good reproduction of an external image distributed over many large displays requires a large amount of computing power, wherein small errors arise very quickly and may be perceived to be unpleasant by passengers.

BRIEF SUMMARY OF THE INVENTION

Aspects of the present application may provide an improved and simplified system for generating a moving image in an aircraft.

According to an embodiment of the invention, the LEDs are arranged in the form of a grid on an aircraft interior wall, such that the image is a schematic reproduction of the image information. Furthermore, the signal output unit is coupled to the gyroscopic sensor in such a way that the position of the image is matched to the spatial position of the aircraft, such that the image forms an artificial horizon for a viewer.

In one embodiment according to the invention, the signal input unit receives the image information from at least one camera that captures an external environment of the aircraft.

In a further embodiment according to the invention, the signal input unit receives predefined image information depending on a position of the aircraft.

The image (in the form of a grid) furthermore preferably comprises additional information, in particular schematically reproduced points of interest. This is preferably performed by way of the cabin management system (CIDS) or else by way of the entertainment system (in-flight entertainment (IFE) system). For this purpose, the CIDS or the IFE system must be able to provide suitable information regarding the position of the aircraft and feed it into the signal input unit.

In a further embodiment according to the invention, the signal output unit is coupled to the CIDS in such a way that the brightness of the LEDs is able to be dimmed. As a result of this, the brightness of the cabin may also be influenced as required.

For the sake of completeness, it is mentioned that the signal input unit and the signal output unit may preferably also be configured as a common signal processing unit, such that as little space as possible of the cabin installation space, which is restricted in any case, is taken up.

Preferably, the aircraft interior wall is configured at least as one of a cabin ceiling, cabin floor or cabin interior wall. In this way, the images may be depicted in a variety of ways and sizes, such that a desired spatial impression is achieved for the passengers. The term cabin ceiling should be understood to mean not only the raft ceiling but also for example parts of the cabin equipment that form a ceiling for a passenger sitting underneath (for example the underside of overhead storage compartments (OHSCs)).

Preferably, the LEDs arranged in the form of a grid are spaced apart from one another by 1 cm to 10 cm, in particular by approximately 4 cm to 6 cm.

The system according to an embodiment of the invention is intended to be accommodated and used in an aircraft.

BRIEF DESCRIPTION OF THE DRAWINGS

The invention is explained below with reference to the two drawings.

DETAILED DESCRIPTION

Figure 1:
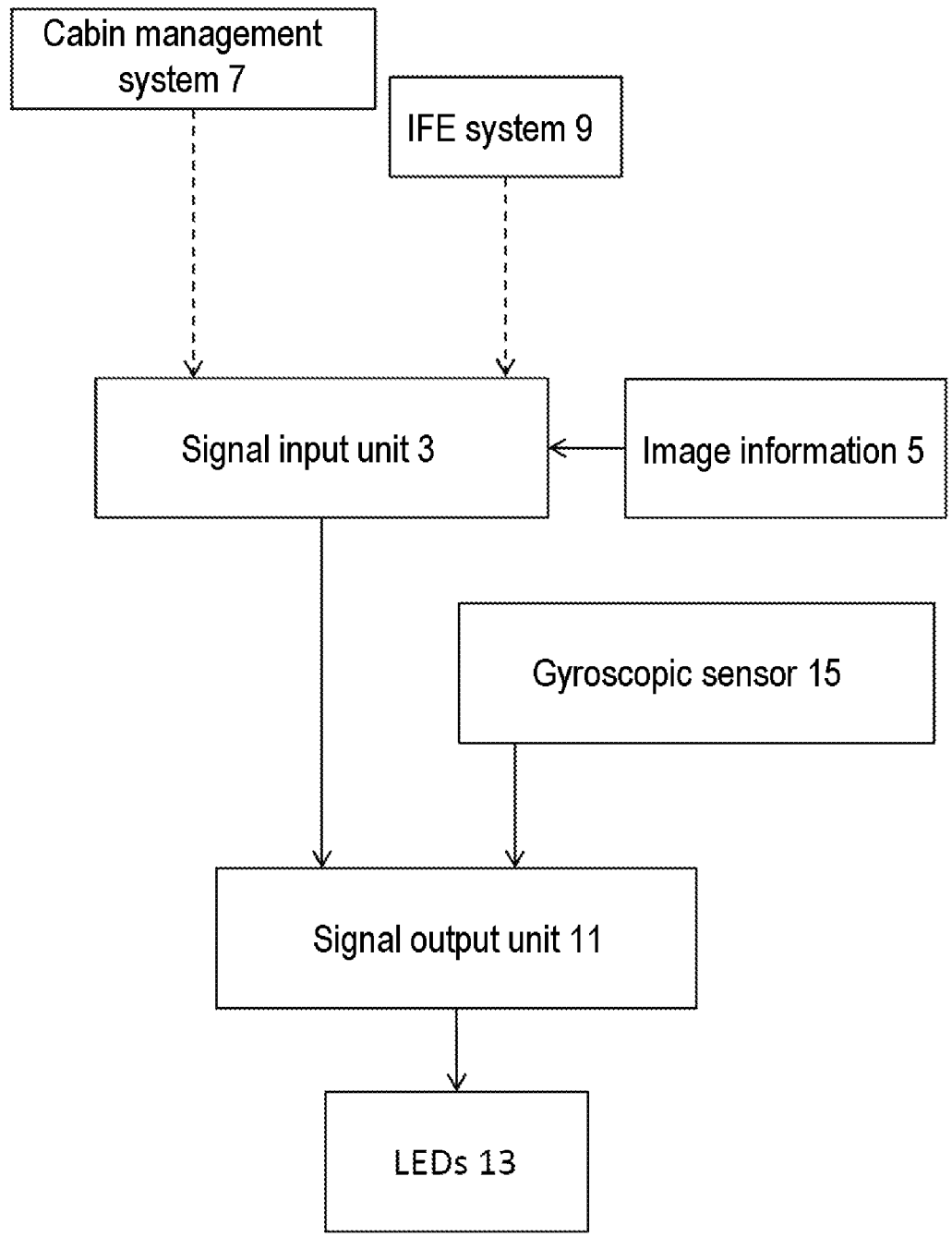
FIG. 1 shows a schematic block diagram of the system according to an embodiment of the invention.

FIG. 1 schematically depicts the system 1 according to an embodiment of the invention for generating a moving image in an aircraft in the form of a schematic block diagram. It has a signal input unit 3, into which image information 5 is fed. This image information 5 may originate for example from a camera that is arranged on the outside of the aircraft and for example captures the view during takeoff and landing or during flying. It is also conceivable, however, for the image information 5 to originate from a video source (for example CIDS 7 or IFE system 9), such that predefined image information 5 is transmitted to the signal input unit 3 in particular depending on a position of the aircraft.

The system furthermore comprises a signal output unit 11 which is coupled to the multiplicity of LEDs 13 and which is suitable for transmitting the image information 5 in a suitable form to a multiplicity of LEDs 13.

Furthermore, a gyroscopic sensor 15 delivers the data that it has acquired regarding the spatial position of the aircraft to the signal output unit 11, such that an image in the form of a grid from a multiplicity of LEDs 13 is not just a schematic reproduction of the image information 5 but rather also forms an artificial horizon for a viewer. As a result of this, motion sickness-induced illness in passengers is avoided.

In order that the schematic reproduction of the image information 5 by way of the LEDs 13 is performed such that the image is also able to be recognized by the passengers, suitable image processing is necessary. It is necessary inter alia to reduce pixels of the image information, for example arriving from a high-resolution external camera, so that the resolution is reduced. To this end, for example, the color of each pixel in the image information 5 may be interpolated using the color information from the adjacent pixel.

The CIDS 7 or possibly also the IFE system 9 may have an influence on whether the image (in the form of a grid) furthermore also contains additional information, such as for example schematically reproduced points of interest. These may be geographical features (longitudes or latitudes, mountains, a volcano, etc.), landmarks (the Eiffel Tower, the Statue of Liberty, etc.) or other buildings. To this end, the CIDS 7 or the IFE system 9 must have suitable information regarding the position of the aircraft and feed it into the signal input unit 3. This information (from the CIDS 7 or the IFE system 9) is then mixed with the image information 5 that is also going into the signal input unit 3 or simply just added thereto.

Furthermore, the signal output unit 11 may be coupled to a cabin management system (for example CIDS) 7 in such a way that the brightness of the LEDs 13 is able to be dimmed. This may depend for example on the time of day at the destination or depend on the external lighting conditions.

Figure 2:
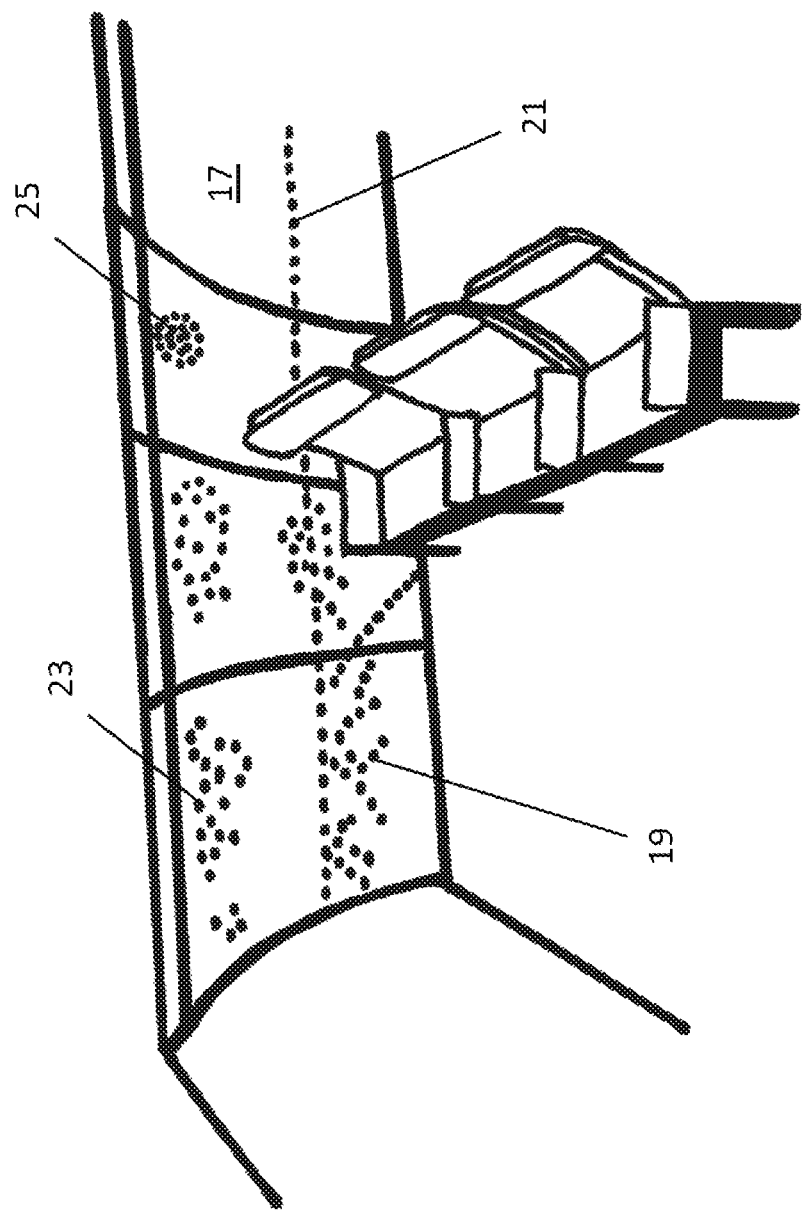
FIG. 2 shows a schematic view of an image generated in an aircraft cabin with the aid of a system according to an embodiment of the invention.

FIG. 2 shows the image in the form of a grid on a cabin interior wall 17, and it is possible to recognize, by way of example, schematically depicted mountains 19, a horizon 21, clouds 23 and a sun 25.

In this case, the LEDs 13 arranged in the form of a grid are preferably spaced apart from one another by 1 cm to 10 cm, particularly preferably by 4 cm to 6 cm.

The image depicted in FIG. 2 would change during a flight not just with regard to the image content but also such that it matches the spatial position of the aircraft. In this case, the image may move up or down or be aligned obliquely from the point of view of the passenger in the aircraft for example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

1 system according to the invention
3 signal input unit
5 image information
7 cabin management system
9 IFE system
11 signal output unit
13 multiplicity of LEDs
15 gyroscopic sensor
17 cabin interior wall
19 mountains
21 horizon
23 clouds
25 sun

The invention claimed is:

1. A system for generating a moving image in an aircraft, comprising:
a multiplicity of LEDs;
a signal input unit configured for receiving image information;
a signal output unit coupled to the multiplicity of LEDs and configured for transmitting the image information to the multiplicity of LEDs; and
a gyroscopic sensor for acquiring a spatial position of the aircraft,
wherein
the LEDs are arranged in the form of a grid on an aircraft interior wall, such that the image is a schematic reproduction of the image information and the signal output unit is coupled to the gyroscopic sensor in such a way that the position of the image is matched to the spatial position of the aircraft, such that the image forms an artificial horizon for a viewer.

2. The system as claimed in claim 1, wherein the signal input unit is configured to receive the image information from at least one camera that captures an external environment of the aircraft.

3. The system as claimed in claim 1, wherein the signal input unit is configured to receive predefined image information depending on a position of the aircraft.

4. The system as claimed in claim 1, wherein the image further comprises additional information including schematically reproduced points of interest.

5. The system as claimed in claim 1, wherein the signal output unit is coupled to a cabin management system in such a way that the brightness of the LEDs is selectively dimmed.

6. The system as claimed in claim 1, wherein the signal input unit and the signal output unit are configured as a common unit.

7. The system as claimed in claim 1, wherein the aircraft interior wall is configured at least as one of a cabin ceiling, cabin floor or cabin interior wall.

8. The system as claimed in claim 1, wherein the LEDs arranged in the form of a grid are spaced apart from one another by 1 cm to 10 cm.

9. The system as claimed in claim 1, wherein the LEDs arranged in the form of a grid are spaced apart from one another by 4 cm to 6 cm.

10. An aircraft having a system as claimed in claim 1.

* * * * *